(12) United States Patent
Lasko et al.

(10) Patent No.: US 8,400,036 B1
(45) Date of Patent: Mar. 19, 2013

(54) HIGH SPECIFIC FORCE CAPACITY THRUST MAGNETIC BEARING AND METHOD OF MAKING

(75) Inventors: Thomas M. Lasko, Melbourne, FL (US); Daniel K. Mason, Cocoa, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 158 days.

(21) Appl. No.: 12/639,023

(22) Filed: Dec. 16, 2009

(51) Int. Cl.
*H02K 7/09* (2006.01)

(52) U.S. Cl. ......... 310/90.5; 310/216.023; 310/216.091; 310/216.093; 310/216.097; 310/216.111; 310/268

(58) Field of Classification Search ................. 310/90.5, 310/216.023, 216.091, 216.093, 216.097, 310/216.111, 268
See application file for complete search history.

(56) References Cited

U.S. PATENT DOCUMENTS

| | | | |
|---|---|---|---|
| 4,920,291 A | 4/1990 | McSparran | |
| 5,179,308 A * | 1/1993 | Malsky | 310/90.5 |
| 5,406,157 A * | 4/1995 | New | 310/90.5 |
| 5,525,848 A | 6/1996 | Pinkerton et al. | |
| 6,008,558 A | 12/1999 | Halsey et al. | |
| 6,841,908 B2 * | 1/2005 | Hasegawa et al. | 310/90.5 |

* cited by examiner

*Primary Examiner* — Tran Nguyen (57) ABSTRACT

A specific force capacity thrust bearing and a method for producing such a design for a particular application are disclosed. The magnetic flux density in the stator material is maximized by varying cross-sectional area normal to the flux path. After a set of initial parameters are chosen, the design can be improved upon by changing the design variables and then verifying the force capacity using a finite element program. By linking the finite element program to a model of the geometry and using some basic algorithms, it is possible to automatically iterate until an optimal design is reached. The resulting design has a much higher force capacity than designs typical of the prior art.

22 Claims, 5 Drawing Sheets

FIG. 1

(PRIOR ART)

HIGH SPECIFIC FORCE CAPACITY THRUST MAGNETIC BEARING AND METHOD OF MAKING

BACKGROUND OF THE INVENTION

1. Field of Art

This invention relates generally to electromagnetic actuators, and especially to thrust actuators for magnetic bearing systems. Improvements in thrust bearing specific force capacity allow for smaller, lighter stators and enable operation at higher speeds.

2. Description of Related Art

Active magnetic bearing (AMB) systems usually have two opposing thrust bearings, one on either side of a thrust disk that is mounted on the shaft. By controlling the current in each of the bearings, the net force on the thrust disk can be controlled in either direction to stabilize the shaft assembly in the axial direction against both static and dynamic forces.

Thrust bearings for AMB systems generally consist of three major components. The stator, which is a stationary cylindrical component made of magnetic material, provides a flux path and houses the coil. The coil, which is a toroidal winding of electrically conductive wire, provides the magnetic flux when power is applied. The thrust disk, which is a flat cylindrical component rigidly attached to the shaft, is composed of a magnetic material that completes the flux path.

The stator and thrust disk are separated by an air gap. When a current passes through the coil, it creates a magnetic flux that travels through the stator and thrust disk, creating a net force that pulls the thrust disk (and therefore the entire shaft assembly) toward the stator. Viewing the thrust bearing in an axisymmetric cross section, the flux path is a closed loop that circles the coil cavity. The path travels through the horseshoe shaped cross section of the stator, across the air gap, radially through the thrust disk, traverses the air gap once more, and back to the stator.

The force generated by the thrust actuator depends on several factors, including the magnetic and structural properties of the stator and thrust disk, the coil current density, the size of the air gap, and the geometry of both the stator and thrust disk.

The first step in sizing a thrust bearing actuator is determining the desired maximum force capacity, which is the force developed when the magnetic material in the stator is saturated with flux and it coincides with the maximum current density in the coil. Using traditional methods, the pole area of the stator is usually determined based on a one-dimensional equation that relates pole area ($A_{pole}$), saturation flux density ($B_{sat}$), and force at saturation ($F_{sat}$):

$$F_{sat} = \frac{A_{pole} \cdot B_{sat}^2}{\mu_0} \qquad (1)$$

Using this relation, the dimensions of the inner pole, outer pole, and back face of the stator are determined. The coil area ($A_{coil}$) is generally made large enough to magnetically saturate the stator material at the maximum current density ($J_{sat}$) using the following equation, where g is the air gap:

$$A_{coil} = \frac{2g \cdot B_{sat}}{\mu_0 \cdot J_{sat}} \qquad (2)$$

Using this coil area, the coil dimensions are selected and generally made such that the cross-sectional area is square or rectangular. The final dimension selected is the thrust disk thickness, which usually matches the thickness of the stator back face.

In general, the configurations described in prior art are not optimal due to flux leakage and inefficient use of stator magnetic material. The objective in producing a particular configuration is to achieve uniform saturation throughout the entire stator. Traditional configurations, however, usually saturate near the transition between the inner pole and the back face even if the coil area and dimensions are chosen properly. Since not all of the stator material is fully saturated, some volume is effectively being wasted. The problem is compounded by the fact that some of the thrust bearing volume could be utilized by making the coil larger, which would in turn provide more available capacity for a given current density. Accordingly, it is an objective of this invention to parameterize the geometry in such a way as to allow for the most efficient use of volume to create the highest thrust bearing capacity.

Figure 1:
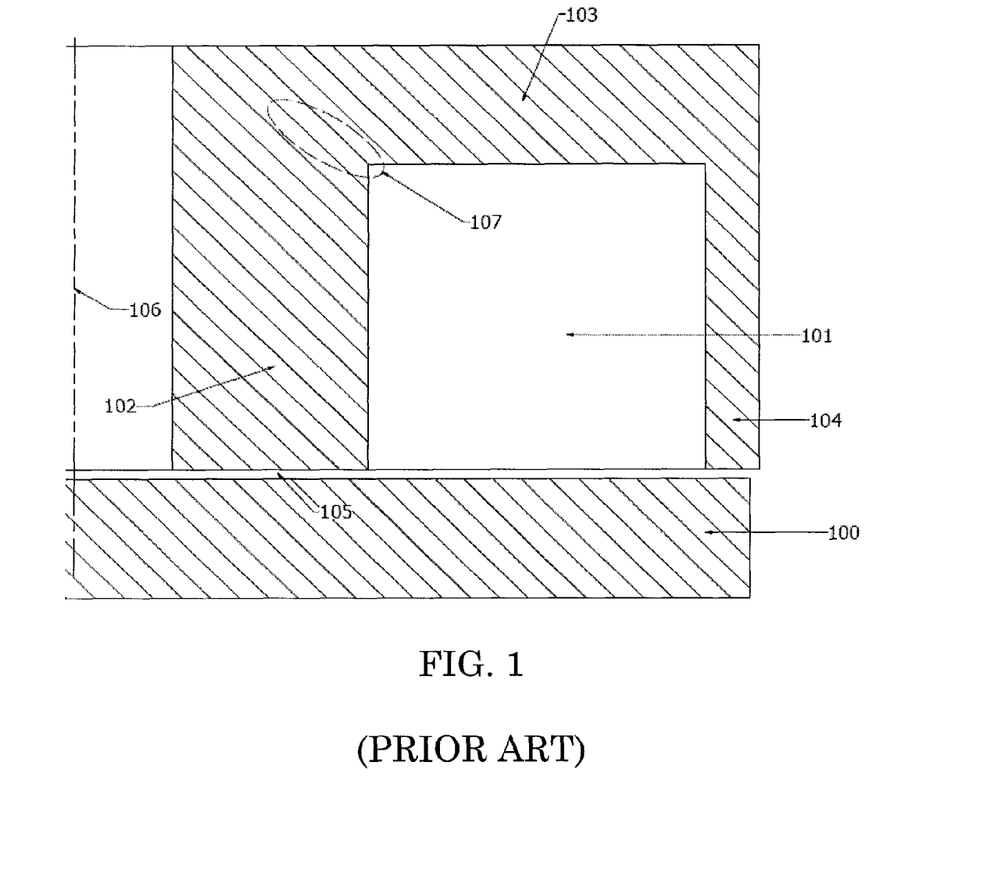
FIG. 1 is an axisymmetric cross section representative of the prior art.

FIG. 1 shows an axisymmetric cross section that is representative of thrust bearings in the prior art, such as in U.S. Pat. No. 5,525,848. The three major components are the thrust disk 100, the coil cavity 101, and the thrust stator, which has an inner pole 102, back face 103, and outer pole 104. The stator and thrust disk are separated by an air gap 105 and both have an axis of symmetry 106. In general, this configuration is employed when the thrust disk diameter can be made as large as the outer diameter of the thrust stator.

In some applications, such a thrust disk would lead to failure of the disk material at high rotational speeds due to excessive stress at the thrust disk hub. In these cases, a "folded" thrust disk or L-shaped configuration is employed as in U.S. Pat. No. 6,008,558.

In some other cases, such as when axial space is very constrained, an "E-core" configuration is used, such as in U.S. Pat. No. 4,920,291. This design features two adjacent rectangular coil cavities, resulting in three poles, much like the letter E in cross section. The "E-core" design, however, requires a large stator diameter and thrust disk diameter. Therefore, it can only be used when the rotational speed is low.

In most cases, the thrust stator geometry is similar to that pictured in FIG. 1, or if not, it usually suffers from the same drawbacks. The major problem with these designs is that a specific part of the stator saturates before the rest of the stator. The prematurely saturated region 107 is shown in FIG. 1 for the representative geometry. The presence of saturation at the transition between the inner pole 102 and the back face 103 indicates that the cross-sectional area normal to the flux path is not large enough to accommodate the flux density at this point. This results in a sub-optimal design in which not all of the stator material is used efficiently, and hence the force capacity is not maximized.

Even if the dimensions of the rectangular region are optimized, the problem is not rectified. It is an inherent property of this parameterization that results in an inefficient thrust actuator design.

SUMMARY OF THE INVENTION

The present invention relates to any electromagnetic force actuator or the like in which a magnetic circuit is produced between a stationary piece of magnetic material and another piece of magnetic material with at least one degree of freedom, and a method for controlling flux saturation uniformity in that circuit. The modulation of the force is accomplished by adjusting the current in the coil, therefore providing more flux in the magnetic circuit. A thrust (axial) magnetic bearing will be used for example purposes, although it will be apparent that the present invention also applies to other electromagnetic actuators or to magnetic bearings with other geometries or configurations. The methods described are also applicable to radial magnetic bearings, combined radial/axial magnetic bearings, solenoids, positioning actuators, and other systems that use an electromagnetic circuit to achieve linear motion. The present invention contemplates its use in all those applications as well.

The present invention relates, more particularly, to a geometrical parameterization for thrust actuators that generates more force capacity per unit volume relative to prior art for a given set of materials and constraints. The cross-sectional area (as it is revolved about the axis of symmetry) of the stator normal to the flux path varies in such a way as to provide maximum total force capacity. This provides the most efficient use of magnetic material relative to the confines of the stator volume such that the material carries a relatively uniform flux density at or near the saturation flux density of the stator material.

In addition to the benefit of making the thrust actuator smaller and lighter for a given target capacity, the reduction in axial space and thrust disk diameter can improve performance of the end product rotor dynamically. Reduction in the length of the shaft increases the bending stiffness, which increases the critical speeds of the rotor, allowing operation at higher speeds and/or increasing the factor of safety. Reduction in thrust disk diameter tends to also allow operation at higher speeds by decreasing the stress at the hub of the thrust disk during operation.

Therefore, in light of the benefits of an efficient high specific force capacity thrust bearing, as well as the aforementioned shortcomings in the prior art, this invention has among other things, the following objectives:

To provide a general parameterization of thrust bearing geometry that captures the features of an optimized stator coil and magnetic material so as to provide nearly uniform flux saturation, resulting in maximum force capacity and therefore minimum size, minimum weight, and maximum efficiency for a given target force capacity To provide the methods necessary for selecting parameters for the configuration geometry, including the process and equations that will reduce the amount of time necessary to converge upon the best solution.

BRIEF DESCRIPTION OF THE DRAWINGS

These and other objects, advantages and features of this invention will be apparent from the following specification thereof taken in conjunction with the accompanying drawings in which.

DETAILED DESCRIPTION OF THE INVENTION

Figure 2:
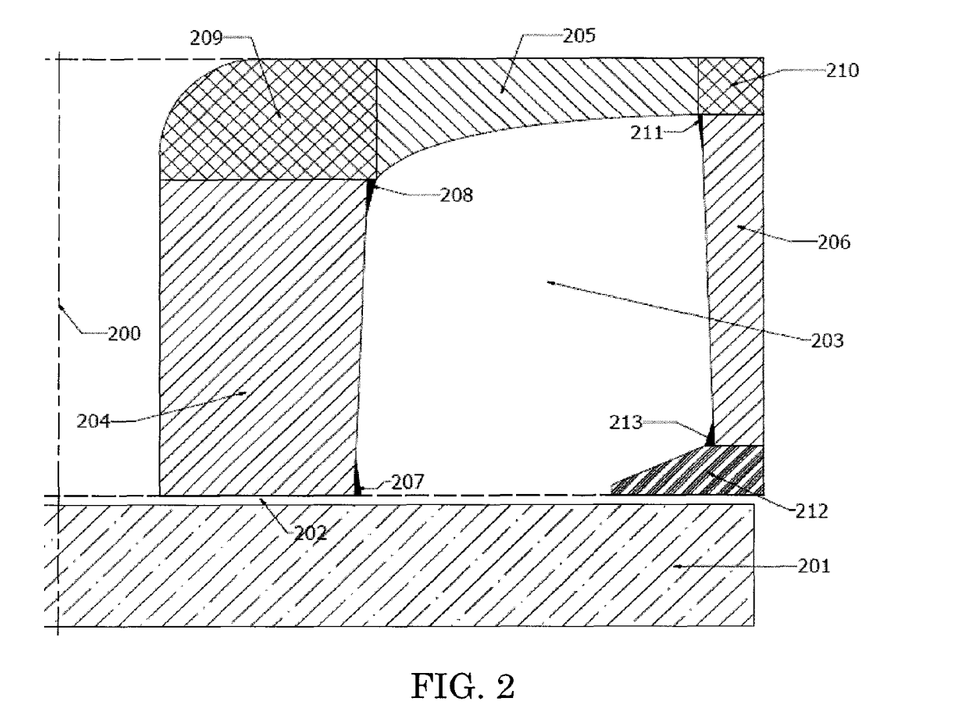
FIG. 2 is an axisymmetric cross section of the basic geometry of this invention.
Figure 3:
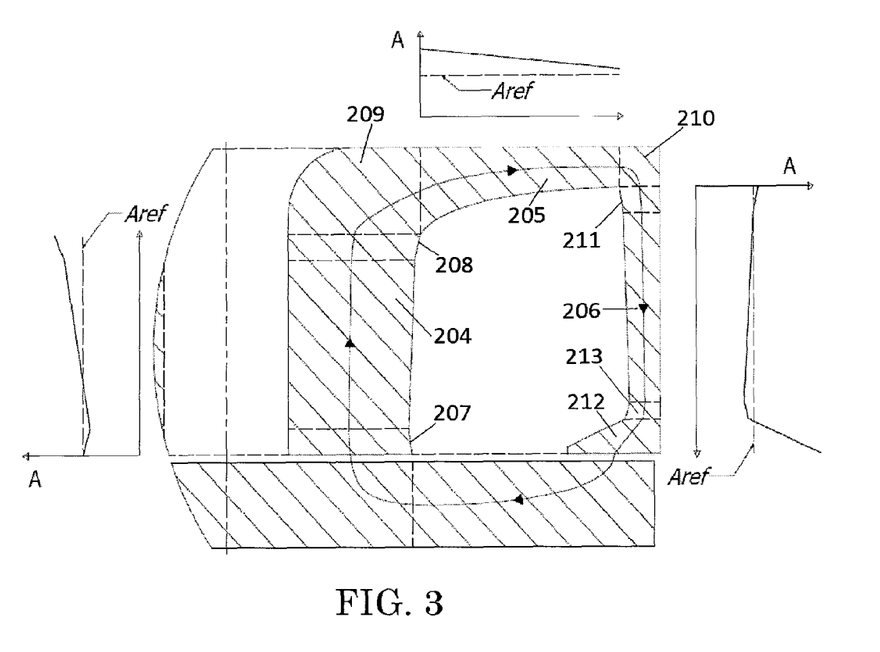
FIG. 3 is an axisymmetric cross section of the flux path and corresponding cross-sectional areas along said flux path.

FIG. 2 shows a cross-sectional geometry that is a substantially improvement in efficiency over the prior art. In order to compare the conventional configuration in FIG. 1, the axis of revolution 200, thrust disk 201, air gap 202 in FIG. 2, and all exterior stator dimensions are the same as in FIG. 1. Unlike the prior art, however, the coil cavity 203 is not rectangular, but rather forms a loop that creates a highly variable cross-sectional area normal to the flux path. The stator still has three major regions as shown in FIG. 2, namely inner pole 204, back face 205, and outer pole 206. FIG. 3 shows how the cross-sectional area changes in these three regions, with area plotted versus distance and the area of the inner pole at the air gap labeled as $A_{ref}$.

The flux path is shown in FIG. 3 as a closed loop with arrows indicating direction. Starting from the inner pole air gap and going clockwise, the cross-sectional area decreases from $A_{ref}$ along the gap face inner pole extension 207. Along the inner pole 204, the area increases above $A_{ref}$ and then increases more rapidly along the back face inner pole extension 208.

At this point, the flux path curves around from the inner pole and transitions to the back face. In this region 209, the flux path goes from being primarily in the axial direction to primarily in the radial direction.

Along the back face 205, the cross-sectional area decreases monotonically until the flux path transitions to the outer pole. In this region 210, the flux path goes from being primarily in the radial direction to primarily in the axial direction. At this point, the cross-sectional area is still slightly greater than $A_{ref}$. Along the outer pole extension near the back face 211, the cross-sectional area decreases to a value close to $A_{ref}$, and then decreases less rapidly along the outer pole 206 to a value below $A_{ref}$. As the path approaches the outer pole diffuser 212, the area begins increasing again in a small transition region 213. In the outer pole diffuser 212, the cross-sectional area increases from a value slightly below $A_{ref}$ to an area much larger than $A_{ref}$ at the air gap 202.

The geometry shown in FIG. 2 and FIG. 3 allows for a much more efficient use of stator material than the prior art exemplified in FIG. 1. By adjusting the cross-sectional area along the flux path as described here, it is possible to saturate the stator material as uniformly as possible.

The benefit of doing this is two-fold. First, the stator material is minimized because the area is adjusted at several locations to be exactly enough to carry the actual magnetic flux at that point along the path. In this way, none of the stator material is wasted due to operating below saturation and the flux path is not restricted by lack of sufficient area. This serves to maximize the efficiency of the design and produce maximum total force capacity.

Secondly, since the outer dimensions remain the same, any inefficiency in the stator will limit the effective coil cavity area that can be utilized. Therefore, minimizing the stator material will also maximize the coil area, which also serves to increase the total force capacity.

The selection of parameters is accelerated via the implementation of known optimization techniques. The path along the exterior of the coil (the interior of the stator) can be described by a small number of points connected by lines to form a loop. The points along the inner pole 204 and outer pole 206 can be constrained to move only in the radial direction and the points along the back face can be constrained to move only in the axial direction. In this way each point only has one degree of freedom (except for the corners, which have two) that determines the cross-sectional area of the stator at that point.

Since the flux density is directly related to the cross-sectional area along the flux path, all of the dimensions along this path are expressed as some multiple (or fraction) of a reference area. In this case, the reference area ($A_{ref}$) is the cross-sectional area of the stator at the interface between the inner pole and the air gap. All other dimensions are derived as a function of this reference area.

Along the inner pole 204, the thickness ($t_i$) of the stator at a specified location is determined by the inner diameter ($D_i$), the reference area ($A_{ref}$), and a multiplicative factor (f). If f equals 1.2, for example, the cross-sectional area at this location is 1.2 times the reference area as described by the following equation:

$$t_i = \sqrt{\frac{1}{\pi} \cdot f \cdot A_{ref} + \left(\frac{D_i}{2}\right)^2} - \left(\frac{D_i}{2}\right) \quad (3)$$

Along the outer pole 206, the thickness ($t_o$) of the stator at a specified location is determined by the outer diameter ($D_o$), the reference area ($A_{ref}$), and a multiplicative factor (f):

$$t_0 = \left(\frac{D_o}{2}\right) - \sqrt{\left(\frac{D_o}{2}\right)^2 - \frac{1}{\pi} \cdot f \cdot A_{ref}} \quad (4)$$

Along the back face 205, the thickness ($t_{of}$) of the stator depends on the diameter at which it is measured ($D_{ref}$), the reference area ($A_{ref}$), and a multiplicative factor (f):

$$t_{of} = \frac{f \cdot A_{ref}}{\pi \cdot D_{ref}} \quad (5)$$

Choosing a reference area is somewhat arbitrary due to the fact that every multiplicative factor will be optimized individually; however, choosing a reasonable reference area allows the process to converge more quickly since the initial geometry will be closer to the optimal geometry. A reasonable starting point is to choose the theoretical pole area required to achieve saturation, but a better choice can be made based on empirical results. In a current preferred embodiment, with a 500 micron air gap, 3.2 MA/m² coil current density, and 2.0 T saturation flux density, it was observed that the following expression provides a reasonable estimate of the reference area in terms of the inner diameter ($D_i$), outer diameter ($D_o$) and effective length ($L_{eff}$), which is the sum of the stator length, the air gap, and the thrust disk thickness:

$$\frac{D_0 \cdot L_{eff}}{A_{ref}} \left( \sqrt{\pi \cdot A_{ref} + \left(\frac{\pi D_i}{2}\right)^2} + \sqrt{\left(\frac{\pi D_o}{2}\right)^2 - \pi \cdot A_{ref}} \right) = \text{constant} \approx 23 \quad (6)$$

Once the reference area is chosen, the geometry is completely dependent upon the selection of each of the multiplicative factors, one for each degree of freedom. Each of these parameters can be changed independently or in any combination. Once a particular set of values is chosen, the geometry can be evaluated using a conventional finite element program. The program will be able to show a flux density plot and calculate the force that is exerted on the thrust disk. For the preferred embodiment, the bearing models were evaluated using FEMM, a magnetic finite element program developed at the University of Virginia.

In order to determine the optimal design for a particular application, a small program can be written as will be readily done by one skilled in the art that iteratively changes parameters based on the theoretical force capacity as calculated by a finite element program. By employing a "hill-climbing" algorithm, a single parameter or any subset of parameters can be varied simultaneously until a local maximum is reached. For the current preferred embodiment, Mathematica, a software package for technical computing, was used to perform this maximization routine.

By directly linking the algorithm logic to the finite element program, the effect of any geometry changes can be automatically fed back into the program from a finite element force calculation from which new parameters are chosen. In this way, the loop can run automatically and can be programmed to stop whenever some stability criterion is achieved.

Since optimizing one parameter will affect, to a lesser extent, the optimal values of the other parameters, the procedure usually has to be executed more than once in order to reach a maximum. Since the iteration can be done automatically, however, the program can generally produce a result near the global maximum within a few minutes of running time. By selecting the parameter subsets in a certain order, this process can be expedited. In the current preferred embodiment, the beginning step is to scale all of the parameters together, which scales all of the cross-sectional areas with respect to the initial geometry. Next, smaller subsets or parameters are varied to improve upon the force output: inner pole, back face, and outer pole. The final step is that each parameter is varied separately. If necessary, these steps are repeated.

Figure 4:
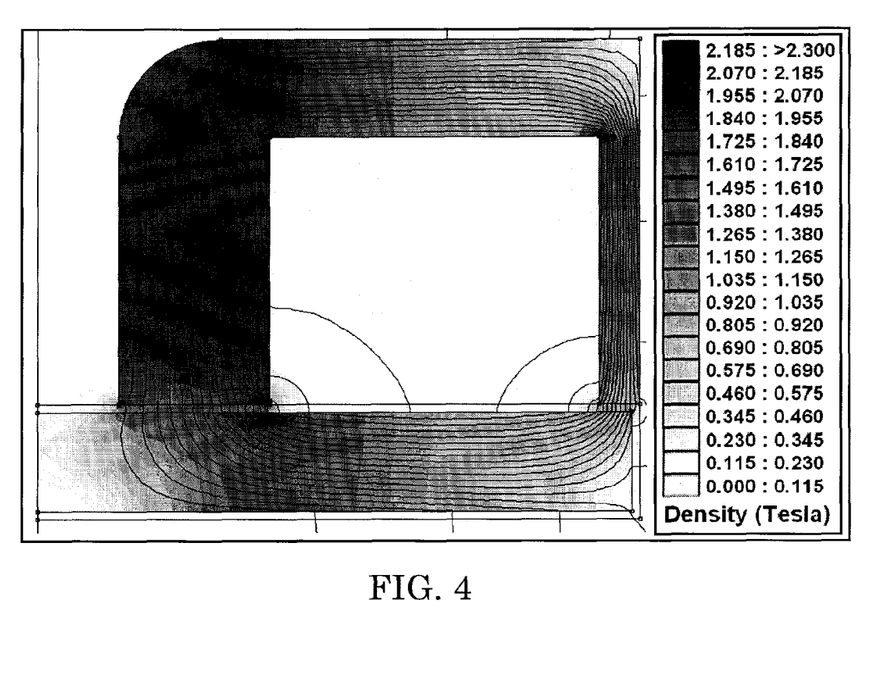
FIG. 4 is a flux density plot of the prior art at the design current density.
Figure 5:
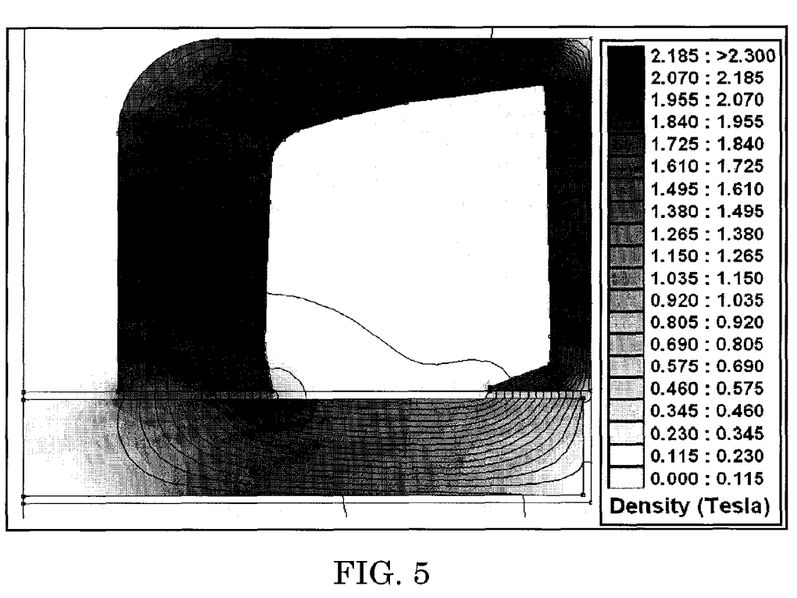
FIG. 5 is a flux density plot of this invention at the design current density.

A comparison of the present invention with the prior art was made using several test cases, one of which is presented here to show the present invention's benefits. In order to compare the designs, certain parameters remain the same for both cases: inner diameter 0.50 in, outer diameter 3.00 in, effective length 1.25 in., current density 3.2 MA/m², and air gap 0.020 in. In addition, the material of the thrust stator is Hiperco 50 and the material of the thrust disk is alloy 4340 steel in both designs. FIG. 4 shows a flux density plot for a thrust bearing with a rectangular coil that is representative of the prior art. The dimensions of the coil have been optimized using finite element, and the resulting force capacity is 879 Newtons. FIG. 5 shows the results with our thrust bearing using the geometry and methods presented here. Note that both figures have the same flux density scale, indicating that the optimized stator is much more uniformly saturated. The resulting force capacity of the optimized stator is 1150 Newtons, which is 30.8% higher than the stator in FIG. 4. Increases of up to 50% have been realized in other cases.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. An electromagnetic actuator having a magnetic material stator and a magnetic material thrust disk separated from each other by a gap and sharing an axis of symmetry, wherein the stator comprises an inner pole having an extension, an outer pole having a diffuser portion and a back face having ends joined to the inner and outer poles at transition regions so as to define a coil cavity bounded by the thrust disk, and is sized and configured so as to have a flux path cross-sectional area that first decreases from a reference cross-sectional area ($A_{ref}$) in a region of the inner pole adjacent the gap, then increases in an immediately adjacent region in a direction toward the back force and then increases even more along a back face inner pole extension with the flux path extending substantially along a direction of the axis of symmetry, whereupon the flux path curves around from the inner pole to the back face in a direction substantially transverse to the axis of symmetry in one of the transition regions upon which the flux path cross-sectional area then decreases monotonically until reaching another of the transition region at the outer pole where the flux path is again substantially along the axial direction and the cross-section area is slightly greater than the reference cross-sectional area ($A_{ref}$) and then decreases to approximately the value of the reference cross-sectional area whereupon it decreases gradually to a value below the reference cross-sectional area ($A_{ref}$), and finally the flux path cross-section area gradually increases in a transition region between the outer pole and the diffuser portion to a value below the reference cross-sectional area ($A_{ref}$) whereupon in the diffuser portion the flux path cross-sectional area increases to a point at the gap substantially above the reference cross-sectional area ($A_{ref}$).

2. The actuator of claim 1, wherein the flux path cross-sectional area is changed throughout the stator solely by sizing and configuring internal surfaces of the inner and outer poles and the back face.

3. The actuator of claim 1, wherein a thickness of the stator along the inner pole is determined by an inner stator diameter ($D_i$), the reference cross-sectional area ($A_{ref}$) and a multiplicative factor (f) as follows:

$$t_i = \sqrt{\frac{i}{\pi} \cdot f \cdot A_{ref} + \left(\frac{D_i}{2}\right)^2} - \left(\frac{D_i}{2}\right).$$

4. The actuator of claim 1, wherein a thickness of the stator along the outer pole is determined by an outer diameter ($D_o$), the reference cross-sectional area ($A_{ref}$) and a multiplicative factor (f) as follows:

$$t_o = \left(\frac{D_o}{2}\right) - \sqrt{\left(\frac{D_o}{2}\right)^2 - \frac{1}{\pi} \cdot f \cdot A_{ref}}.$$

5. The actuator of claim 1, wherein a thickness of the status at any point along the back face is determined at the point of measurement ($D_{ref}$), the reference cross-sectional area ($A_{ref}$) and a multiplicative factor (f) as follows:

$$t_{of} = \frac{f \cdot A_{ref}}{\pi \cdot D_{ref}}.$$

6. The actuator of claim 1, wherein the reference cross-sectional area ($A_{ref}$) is approximated in terms of an inner stator diameter ($D_i$), an outer stator diameter ($D_o$) and an effective length ($L_{eff}$) defined by stator length, the gap thickness and thrust disk thickness as follows:

$$\frac{D_o \cdot L_{eff}}{A_{ref}} \left( \sqrt{\pi \cdot A_{ref} + \left(\frac{\pi D_i}{2}\right)^2} + \sqrt{\left(\frac{\pi D_o}{2}\right)^2 - \pi \cdot A_{ref}} \right) = \text{constant.}$$

7. An electromagnetic actuator having a magnetic material stator and a magnetic material thrust disk separated from each other by a gap and sharing an axis of symmetry, wherein the stator comprises an inner pole having an extension, an outer pole having a diffuser portion and a back face having ends joined to the inner and outer poles at transition regions so as to define a coil cavity bounded by the thrust disk, made by a process of defining points connected by lines to describe a path along the interior of the stator and form a loop, and constraining the points along the inner pole and the outer pole to move in only one direction and the points along the back face to move in another direction transverse to the first direction such that each point has only one degree of freedom except in transition region between the back face and the inner and outer poles where the points have two degrees of freedom.

8. The actuator of claim 7, wherein the flux path cross-sectional area is changed throughout the stator solely by sizing and configuring internal surfaces of the inner and outer poles and the back face.

9. The actuator of claim 7, wherein a thickness of the stator along the inner pole is determined by an inner stator diameter ($D_i$), a reference cross-sectional area ($A_{ref}$) in a region of the inner pole adjacent the gap and a multiplicative factor (f) as follows:

$$t_i = \sqrt{\frac{i}{\pi} \cdot f \cdot A_{ref} + \left(\frac{D_i}{2}\right)^2} - \left(\frac{D_i}{2}\right).$$

10. The actuator of claim 7, wherein a thickness of the stator along the outer pole is determined by an outer diameter ($D_o$), a reference cross-sectional area ($A_{ref}$) in a region of the inner pole adjacent the gap and a multiplicative factor (f) as follows:

$$t_o = \left(\frac{D_o}{2}\right) - \sqrt{\left(\frac{D_o}{2}\right)^2 - \frac{1}{\pi} \cdot f \cdot A_{ref}}.$$

11. The actuator of claim 7, wherein a thickness of the status at any point along the back face is determined at the point of measurement ($D_{ref}$), a reference cross-sectional area ($A_{ref}$) in a region of the inner pole adjacent the gap and a multiplicative factor (f) as follows:

$$t_{of} = \frac{f \cdot A_{ref}}{\pi \cdot D_{ref}}.$$

12. The actuator of claim 7, wherein the reference cross-sectional area ($A_{ref}$) is approximated in terms of an inner stator diameter ($D_i$), an outer stator diameter ($D_o$) and an effective length ($L_{eff}$) defined by stator length, the gap thickness and thrust disk thickness as follows:

$$\frac{D_o \cdot L_{eff}}{A_{ref}} \left( \sqrt{\pi \cdot A_{ref} + \left(\frac{\pi D_i}{2}\right)^2} + \sqrt{\left(\frac{\pi D_o}{2}\right)^2 - \pi \cdot A_{ref}} \right) = \text{constant.}$$

13. An electromagnetic actuator having a magnetic material stator and a magnetic material thrust disk separated from each other by a gap and sharing an rotational axis, wherein the stator comprises an inner pole having an extension, an outer pole having a diffuser portion extending along the gap in a direction normal to the rotational axis and a back face having ends joined to the inner and outer poles at transition regions so as to define a coil cavity bounded by the thrust disk, wherein a flux path cross-sectional area in the outer pole increases one end of the diffuser portion in a thickness direction of the gap so as to have a substantially greater value at another end of the diffuser portion adjacent the gap.

14. The actuator of claim 13, wherein the flux path cross-sectional area is changed throughout the stator solely by sizing and configuring internal surfaces of the inner and outer poles and the back face.

15. The actuator of claim 13, wherein a thickness of the stator along the inner pole is determined by an inner stator diameter ($D_i$), a reference cross-sectional area ($A_{ref}$) in a region of the inner pole adjacent the gap and a multiplicative factor (f) as follows:

$$t_i = \sqrt{\frac{i}{\pi} \cdot f \cdot A_{ref} + \left(\frac{D_i}{2}\right)^2} - \left(\frac{D_i}{2}\right).$$

16. The actuator of claim 13, wherein a thickness of the stator along the outer pole is determined by an outer diameter ($D_o$), a reference cross-sectional area ($A_{ref}$) in a region of the inner pole adjacent the gap and a multiplicative factor (f) as follows:

$$t_o = \left(\frac{D_o}{2}\right) - \sqrt{\left(\frac{D_o}{2}\right)^2 - \frac{1}{\pi} \cdot f \cdot A_{ref}}.$$

17. The actuator of claim 13, wherein a thickness of the status at any point along the back face is determined at the point of measurement ($D_{ref}$), a reference cross-sectional area ($A_{ref}$) in a region of the inner pole adjacent the gap and a multiplicative factor (f) as follows:

$$t_{of} = \frac{f \cdot A_{ref}}{\pi \cdot D_{ref}}.$$

18. The actuator of claim 13, wherein the reference cross-sectional area ($A_{ref}$) is approximated in terms of an inner stator diameter ($D_i$), an outer stator diameter ($D_o$) and an effective length ($L_{eff}$) defined by stator length, the gap thickness and thrust disk thickness as follows:

$$\frac{D_o \cdot L_{eff}}{A_{ref}} \left( \sqrt{\pi \cdot A_{ref} + \left(\frac{\pi D_i}{2}\right)^2} + \sqrt{\left(\frac{\pi D_o}{2}\right)^2 - \pi \cdot A_{ref}} \right) = \text{constant.}$$

19. A computer-implemented method for configuring the electromagnetic actuator according to claim 1 to minimize the stator magnetic material and maximize an area of the coil cavity, comprising:
    defining points along an interior surface of the stator, which points axe connected by lines to form a loop,
    constraining the points along the inner and outer poles of the stator to move only radially and the points along the back face only axially so that each point has only one degree of freedom except at corners of the stator,
    expressing dimensions along the flux path as a multiple or a fraction of the reference cross-sectional area with all other actuator dimensions being derived from the reference cross-sectional area, and
    using a finite element program to evaluate particular geometries of the actuator where dimensions are changeable independently and/or in any combination.

20. The method of claim 19, wherein the reference cross-sectional area ($A_{ref}$) is selected as one of a theoretical pole area required for flux saturation and an area based upon empirical data.

21. The method of claim 19, wherein a further program which iteratively changes parameters based on theoretical force capacity is operatively linked to the finite element program.

22. The method of claim 21, wherein geometric change results in actuator configuration are automatically fed back into the further program from a force calculation performed by the finite element program whereby new parameters can be chosen by way of a continuous loop operation programmed to be stopped upon reaching a selected stability criterion.

* * * * *